(12) United States Patent
Jia et al.

(10) Patent No.: US 9,775,108 B2
(45) Date of Patent: Sep. 26, 2017

(54) METHOD AND EQUIPMENT FOR SAVING ENERGY

(75) Inventors: Beibei Jia, Beijing (CN); Dajun Zhang, Beijing (CN); Jinbo Zhao, Beijing (CN); Sen Xu, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 265 days.

(21) Appl. No.: 13/643,999

(22) PCT Filed: Apr. 18, 2011

(86) PCT No.: PCT/CN2011/072953
§ 371 (c)(1),
(2), (4) Date: Jan. 3, 2013

(87) PCT Pub. No.: WO2011/134359
PCT Pub. Date: Nov. 3, 2011

(65) Prior Publication Data
US 2013/0095842 A1    Apr. 18, 2013

(30) Foreign Application Priority Data
Apr. 29, 2010 (CN) .......................... 2010 1 0163089

(51) Int. Cl.
*H04W 52/02*    (2009.01)
*H04W 28/16*    (2009.01)
(Continued)

(52) U.S. Cl.
CPC ....... *H04W 52/0206* (2013.01); *H04W 28/16* (2013.01); *H04W 52/0203* (2013.01); *Y02B 60/50* (2013.01)

(58) Field of Classification Search
CPC ..... H04L 63/08; G06F 9/45533; G06F 21/56; H04W 24/02; H04W 28/08; H04W 36/08;
(Continued)

(56) References Cited

U.S. PATENT DOCUMENTS 8,743,766 B2*  6/2014  Barber .................. H04W 48/18
                                                    370/310.2
2006/0229083 A1* 10/2006 Redi ................. H04W 52/0216
                                                    455/453
(Continued)

FOREIGN PATENT DOCUMENTS

CN    101043640 A    9/2007
CN    101080047 A    11/2007
(Continued)

OTHER PUBLICATIONS

Methods and apparatus for controlling a base station's transmission power,Junyi Li [US]; Xinzhou Wu [US]; Arnab Das [US] ± (Li Junyi, ; Wu Xinzhou, ; Das Arnab), pp. 61,CN101322326, Dec. 10, 2008.*

(Continued)

*Primary Examiner* — Inder Mehra
(74) *Attorney, Agent, or Firm* — Ladas & Parry, LLP

(57) ABSTRACT

The present invention discloses a method and equipment for saving energy. The method comprises the following steps: the first network node acquires load information of the second network node next to the first and modifies energy saving state according to its own load information and that of said second network node; said first and second network nodes send information on indication for saving energy state to the adjacent third network node and inform the information of modifying energy saving state to said third network node based on said information on indication for saving (Continued)

energy state. Embodiments of the present invention optimize resource utilization rate of the whole network.

18 Claims, 5 Drawing Sheets

(51) Int. Cl.
*H04W 48/06* (2009.01)
*H04W 28/02* (2009.01)

(58) Field of Classification Search
CPC . H04W 52/0206; H04W 92/20; H04W 16/18; H04W 16/24; H04W 24/06; H04W 24/08; H04W 24/10; H04W 28/0268; H04W 36/0083; H04W 36/0094; H04W 36/04; H04W 36/22; H04W 28/16; Y02B 60/50
USPC ..... 370/311, 338, 468; 455/418, 435.1, 439, 455/450, 447, 453
See application file for complete search history.

(56) References Cited

U.S. PATENT DOCUMENTS

| | | |
|---|---|---|
| 2007/0253385 A1 | 11/2007 | Li et al. |
| 2008/0068195 A1* | 3/2008 | Ritter et al. ................. 340/669 |
| 2011/0249558 A1* | 10/2011 | Raaf .................... H04B 7/2606 370/237 |
| 2012/0015657 A1* | 1/2012 | Comsa .............. H04W 36/0094 455/436 |
| 2017/0144724 A1* | 5/2017 | Murugesan .............. B62M 6/50 |

FOREIGN PATENT DOCUMENTS

| | | |
|---|---|---|
| CN | 101322326 A | 12/2008 |
| WO | 2007/047669 A1 | 4/2007 |
| WO | 2009/133952 A1 | 11/2009 |

OTHER PUBLICATIONS

IPRP for corresponding PCT/CN2011/072953 issued on Oct. 30, 2012 and its English translation.
ISR for corresponding PCT/CN2011/072953 mailed on Jul. 28, 2011 and its English translation.
Decision of Reexamination dated Jan. 25, 2016 for Chinese Patent Application No. 201010163089.5 and its English translation provided by Applicant's foreign counsel.
European Search Report and Written Opinion dated Feb. 19, 2014 for European Patent Application No. 11774350.0.
Decision of Rejection dated Jul. 8, 2014 for Chinese Patent Application No. 201010163089.5 and its English translation provide by Applicant's foreign counsel.
Notification of Reexamination dated Jun. 26, 2015 for Chinese Patent Application No. 201010163089.5 and its English translation provided by Applicant's foreign counsel.
Notification of Reexamination dated Oct. 19, 2015 for Chinese Patent Application No. 201010163089.5 and its English translation provided by Applicant's foreign counsel.
Office Action dated Nov. 30, 2012 for Chinese Patent Application No. 201010163089.5 and its English translation provided by the Applicant's foreign counsel.
Office Action dated Jun. 24, 2013 for Chinese Patent Application No. 201010163089.5 and its English translation provided by the Applicant's foreign counsel.
Office Action dated Dec. 17, 2013 for Chinese Patent Application No. 201010163089.5 and its English translation provided by the Applicant's foreign counsel.
3GPP TR 32.826 V10.0, 3$^{rd}$ Generation Partnership Project; Technical Specification Group Services and System Aspects; Telecommunication management; Study on Energy Savings Management (ESM) (Release 10), Mar. 2010.
R3-100163, 3GPP TSG-RAN WG3 #66bis, LTE energy saving solution proposal to cell switch off/on, Huawei, Valencia Spain; Jan. 18-22, 2010.

* cited by examiner

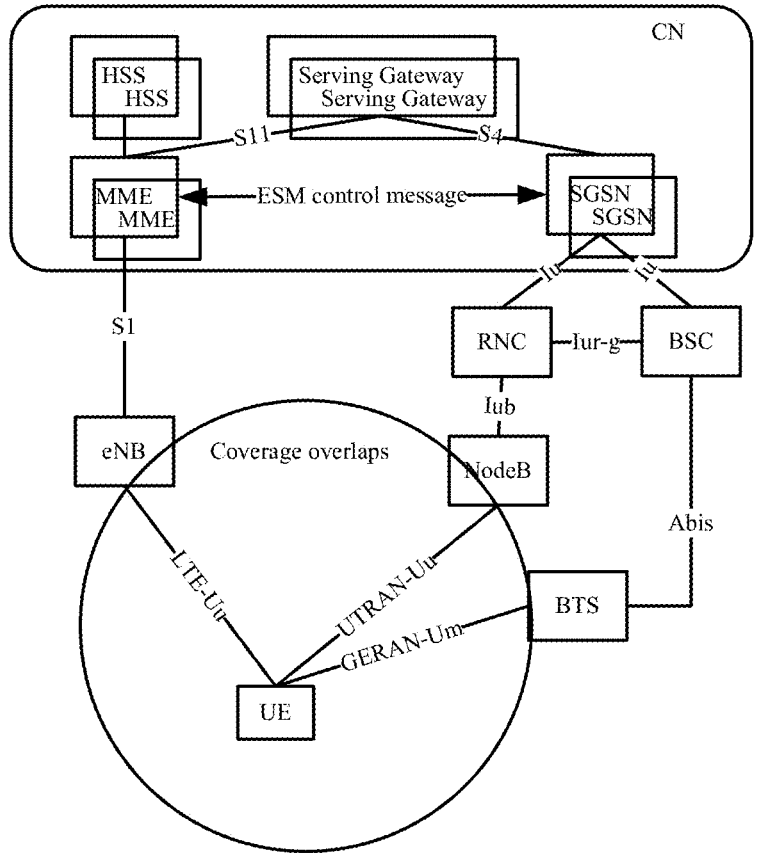

Figure 1

201 — the first network node acquires the load information of the second network node next to the first, and enters energy saving state according to its own load information and that of said second network node 202 — the first network node sends the information on indication for saving energy state to the third network node next to the first, and informs said third network node of the information that it has entered energy saving state through said information

METHOD AND EQUIPMENT FOR SAVING ENERGY

CROSS-REFERENCE TO RELATED APPLICATIONS

This application is the U.S. National Stage of International Patent Application No. PCT/CN2011/072953 filed on Apr. 18, 2011, which claims priority to Chinese Patent Application No. 201010163089.5 entitled "A method and Equipment for Saving Energy" filed in the Patent Office of the People's Republic of China on Apr. 29, 2010, the disclosures of which are hereby incorporated by reference in their entireties.

FIELD OF THE INVENTION

The present invention relates to the field of mobile communication technology, and particularly to a method and equipment for saving energy.

BACKGROUND OF THE INVENTION

Environment protection and response to climatic change have been a huge challenge for human beings along with technological progress and economic development. With the increase of energy consumption, in telecommunication industry, more and more operators begin to care their own social responsibility and operation cost aroused by rise in energy price.

At present, approaches for saving energy of mobile communication network mainly cover: optimizing station location quantity on premise of guaranteeing no influence on coverage, capacity and service quality; finding effective method to improve energy efficiency and reduce equipment power consumption; researching and developing sustainable energy (wind energy, solar energy, etc.).

As for equipment of RAN (Radio Access Network) side required at peak hour, if there are 4 transceivers in each section and three sections in a cell, the 12 transceivers will be in activation state all the time. After introducing energy control mechanism, service demand can be satisfied just by keeping one transceiver in standby state in each section at low service period (such as late night). If the energy saving strategy aforesaid can be applied for all eNB (Evolved Node B), a large amount of energy can be saved without lowering service quality.

In light of self-optimizing network, energy saving entity includes the following three structures: distributed architecture, in which network element will collect necessary information for self-optimizing and participation of OAM (Operation Administration Maintenance) system is unnecessary; centralized architecture of, in/of which OAM system collects information from network element to trigger off energy saving algorithm and then decides subsequent action of network element; hybrid architecture that the two architectures abovementioned are used in mixing.

An ESM (Energy Saving Management) solution is put forth in current communication system to improve resource utilization rate of the overall or part of the network. ESM will launch appropriate action by ways of collecting and assessing related information from network to adjust network configuration to further satisfy service demand. ESM solutions can cover the following two basic processes: energy saving activation that realizing the purpose of saving energy by closing eNB cell or restricting to use part of physical sources, thus corresponding eNB will come to energy saving state; energy saving deactivation, viz. open the cell closed or resume the utilization of the restricted physical resources to meet the increasing service demand and Qos (Quality of Service) demand, corresponding eNB cell is recovered to normal state from energy saving activation state. Wherein, energy saving action comprises: close/open cell, close/open carrier, close/open transceiver, close/open HeNB (Home Evolved Node B) and so on. When a certain network element is in ESM state, surrounding network elements in normal working state will be in energy saving compensation activation state to compensate energy saving service loss of cell in energy saving state via expanding coverage and other methods.

The inventor finds out in the process realizing the present invention that at least the following problems exist in existing technology:

At present, corresponding energy saving solutions and process are only provided in LTE (Long Term Evolution) system and only X2 interface supports energy saving solutions in LTE system. In inter-system network where LTE-A (LTE-Advanced), LTE, UMTS (Universal Mobile Telecommunications System) and GSM (Global System for Mobile Communications) coexist as shown in FIG. 1, since it includes S1, Iub, Iu, Abis, A/Gb, Iur-g and other interfaces, present energy saving solution is imperfect and energy saving function can not be realized for the scene repeatedly covered or non-repeatedly covered between inter-systems.

SUMMARY OF THE INVENTION

The embodiments of the present invention provide an energy saving method and equipment for optimizing resource utilization rate of the overall network.

The embodiments of the present invention provide a method for saving energy, comprising the following steps:

The first network node acquires the load information of the second network node next to the first, and enters energy saving state according to its own load information and that of said second network node;

Said first network node sends the information on indication for saving energy state to the third network node next to the first, and informs said third network node of the information that it has entered energy saving state through said information.

Also, the embodiments of the present invention provide a method for saving energy, comprising the following steps:

The first network node acquires the load information of the second network node next to the first, and judges whether said second network node modifies energy saving state according to the load information of itself and that of said second network node;

Said first network node sends the indication information on modification for saving energy state to the second network node next to the first, and triggers the second network node to change energy saving state through said information.

The embodiments of the present invention also provide a network node, involving:

Acquisition module, which is used for acquiring the load information of the adjacent network node;

Energy saving module, which is used for entering energy saving state according to the load information of said network node and that of the adjacent network node acquired by said acquisition module;

Transmitting module, which is used for sending the information on indication for saving energy state to the adjacent network node when said energy saving module enters energy saving state, and informing said adjacent network node of the information that said network node has entered energy saving state through said information.

The embodiments of the present invention also provide a network node, involving:

Acquisition module, which is used for acquiring the load information of the adjacent network node;

Judgment module, which is used for judging whether said adjacent network node is allowed to modify energy saving state according to the load information of said network node and that of the adjacent network node acquired by said acquisition module;

Transmitting module, which is used for sending the indication information on modification for saving energy state to said adjacent network node when said judgment module allows said adjacent network node to modify energy saving state, and triggering said adjacent network node to modify energy saving state through said information.

The technical solution of embodiments of the present invention has the following advantages, such as energy saving procedure in communication network of inter-system, realizing ESM procedure through algorithm strategy and signaling procedure, optimizing resource utilization rate of the whole network by adopting distributed energy saving structure. During the implementation, ANR is adopted when acquiring network topology, which may relates to OAM. When ANR is not related to OAM, it still has another advantage that OAM is not required to participate in the realization of ESM.

BRIEF DESCRIPTION OF THE DRAWINGS

FIG. 1 is a structure diagram of inter-system network structure in present technology;

FIG. 2 is a flow diagram for saving energy method of Embodiment 1 of the present invention;

DETAILED DESCRIPTION OF PREFERRED EMBODIMENTS

Figure 3:
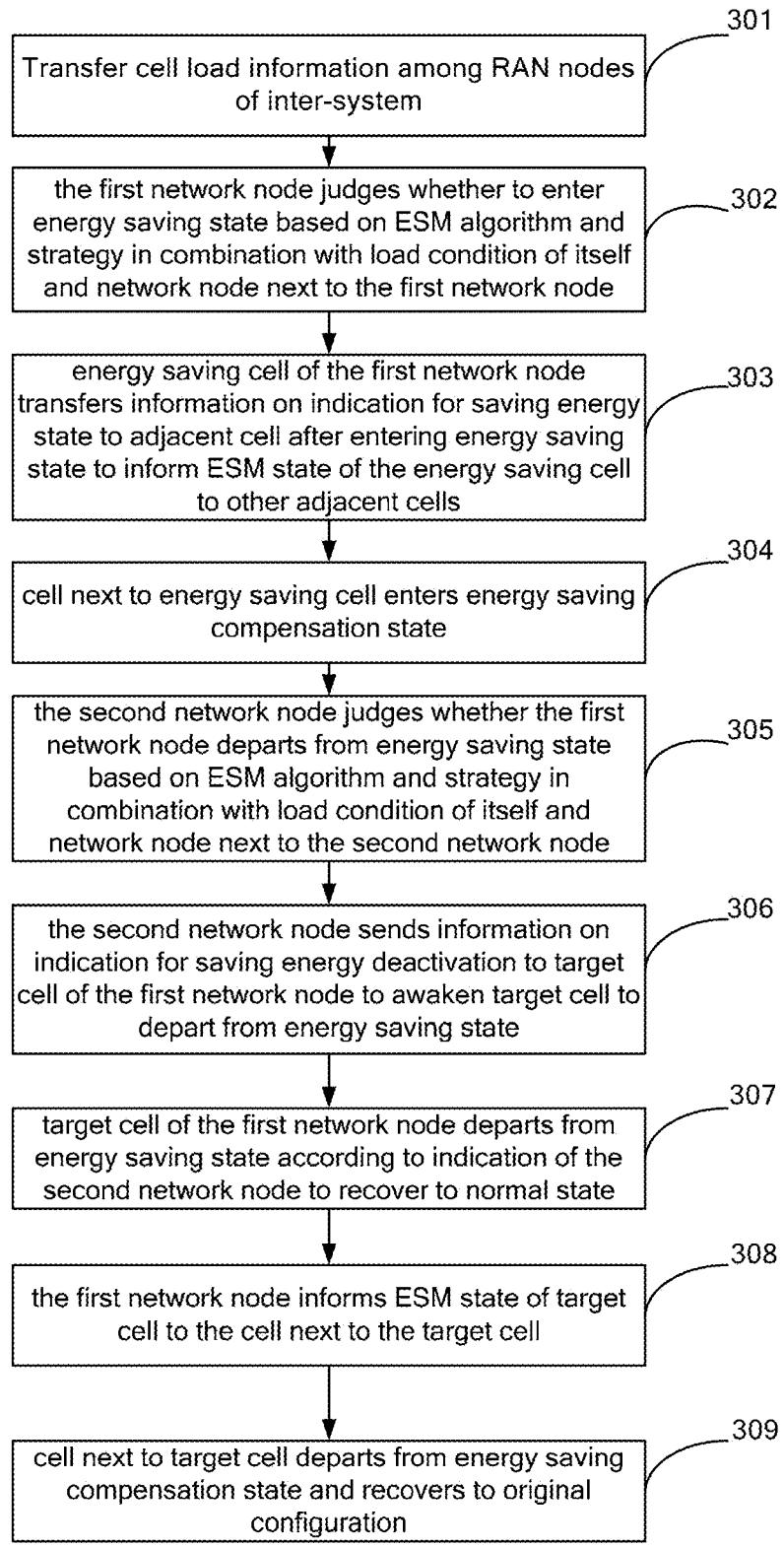
FIG. 3 is a flow diagram of a method for reporting power headroom of Embodiment 2 of the present invention.

The embodiments of the present invention provide a solution of realizing energy saving by utilizing load information of network node in inter-system network considering energy saving demand, which, adopting distributed energy saving structure, can be applied for the scene covered in overlapping or non-overlapping among diversified inter-systems including LTE, UMTS, GSM and so on and furthermore can be applied in LTE-A system.

Specifically, network node can judge whether the cell/carrier/transceiver administrated by itself enters energy saving state (energy saving activation) according to ESM algorithm and strategy through alternative cell load information among network nodes of inter-system and in combination with the load condition of its own and adjacent network nodes, and also inform neighbor of the energy saving cell of the ESM state of the cell via information on indication for saving energy state. Departure for saving energy cell from energy saving state (energy saving deactivation) can be realized through awakening neighbor network nodes. Also, ESM process aforesaid can be implemented via carrying energy saving indication during handover or setting handover cause value as energy saving.

Network node can also judge and allow implementing ESM process for cell/carrier/transceiver administrated by network nodes next to it via alternative cell load information among network nodes of inter-system based on ESM algorithm and strategy in combination with load condition of itself and network nodes next to it to send energy saving state change indication to target cell, thus allowing target cell to change energy saving state. After receiving energy saving state change indication, adjacent network node will respond to the indication in combination with its ESM algorithm and can ask target cell to change energy saving state directly, or feed back the indication to return indication whether to change energy saving state. If energy saving state is successfully changed in target cell, adjacent network node will notify neighbor cell the ESM state of the target cell in accordance with network topology acquired; if energy saving failed to be changed in target cell, the original configuration will be remained.

In the following parts, detailed, clear and complete description of the technology solutions of the present invention will be presented in combination with drawings of the embodiments. It is clear that the embodiments of the present invention described here are only parts of the embodiments of the present invention. Based on the embodiments of the present invention, any other embodiments made by technical personnel of the field in the absence of creative work all belong to the scope of the patent protection of the invention.

As shown in FIG. 2, it is a flow diagram of a method for saving energy of Embodiment 1 of the present invention. The method is comprised of the following steps:

Step 201, the first network node acquires the load information of the second network node next to the first, and enters energy saving state according to its own load information and that of said second network node.

Specifically, the first network node can send load information transmission request message to the second network node and receive the load information transmission response message returned from the second network node to acquire load information of the second network node based on the request and response; the first network node can also receive load information transmission request message from the second network node to acquire load information of the second network node carried in request message. Wherein, load information comprises at least one item among the following: hardware load indicator, S1 TNL load indicator, radio resource status, composite available capacity uplink and composite available capacity downlink.

Step 202, the first network node sends the information on indication for saving energy state to the third network node next to the first, and informs said third network node of the information that it has entered energy saving state through said information.

Wherein, the second and the third network node can share the same node. Information on indication for saving energy state comprises at least one item among the following: source eNB ID, source cell ID, target eNB ID, target cell ID, routing information, energy saving instruction and reason for handover. The first network node informs the information of entering energy saving state to the third network node through information on indication for saving energy state and then the third network node enters energy saving compensation state based on that indication for saving energy state. The first network node also can acquire network topology information after entering energy saving state according to load information of itself and the second network node and then determines whether it is necessary to send information on indication for saving energy state to the said third network node based on the said network topology information.

In addition, the third network node judges whether the first network node departs from energy saving state in accordance with the load information of itself and adjacent network node and sends information on indication for saving energy deactivation to the first network node; the first network node receives the information on indication for saving energy deactivation and departs from energy saving state in accordance with the said information. Wherein, information on indication for saving energy deactivation covers at least one item among the following: source eNB ID, source cell ID, target eNB ID, target cell ID, routing information, energy saving instruction and reason for handover. The first network node also can send information on indication for saving energy state to the third network node after departing from energy saving state based on energy saving deactivation message and inform the information of departing from energy saving state to the third network node through the information on indication for saving energy state; the third network node will depart from energy saving compensation state based on the said information on indication for saving energy state.

The technical solution of the embodiments of the present invention has the following advantages, such as providing energy saving procedure in communication network of inter-system, realizing ESM procedure through algorithm strategy and signaling procedure, and adopting distributed energy saving structure to optimize resource utilization rate of the whole network.

As shown in FIG. 3, it is a flow diagram of a method for saving energy of Embodiment 2 of the present invention. The method comprises the following steps:

Step 301, transfer cell load information among RAN nodes of inter-system.

Specifically, as for LTE system and UMTS system, energy saving can be controlled and realized through S1 interface, Iu interface and Iub interface jointly since there is no direct interface between systems. Similarly, energy saving or LTE system and GSM system can be controlled and realized jointly via S1 interface, Iu (A/Gb) and Abis interface.

Cell load and energy saving state indication as well as other information between RAN nodes of inter-system can be transferred through RIM PROCESS (Information Exchange Initiation) process of S1 interface and Iu interface. It can be realized through MME Direct Information Transfer and eNB Direct Information Transfer process when on S1 interface, and through Direct Information Transfer process when on Iu interface. Core net node transfers the information. In view of the multiple system and subsequent system evolution, other interface message can be adopted to transfer information on indication for saving energy state and cell load information. Moreover, cell load information can be transferred in mode of request or response or by carrying load information in request message.

Wherein, the load information alternated between eNBs of inter-system is shown in Table 1 as below.

TABLE 1

Load Information Alternated between ENBs of Inter-system

| Information type | Information description |
|---|---|
| Cell Measurement Result | Load information exchanging cell list |
| >Cell ID | Cell ID |
| >Hardware Load Indicator | 硬件负荷指示信息 |
| >S1 TNL Load Indicator | S1 接口传输网络层负荷指示信息 |
| >Radio Resource Status | 无线资源状态信息 |
| >Composite Available Capacity Group | 小区容量信息 |
| >>Composite Available Capacity Downlink | 下行小区容量信息 |
| >>Composite Available Capacity Uplink | 上行小区容量信息 |

Step 302, the first network node judges whether to enter energy saving state based on ESM algorithm and strategy in combination with load condition of itself and network node next to the first network node.

Specifically, network node entering energy saving state comprises: cell/carrier/transceiver administrated by network node enters energy saving state, viz. energy saving activation.

Step 303, energy saving cell of the first network node transfers information on indication for saving energy state to adjacent cell after entering energy saving state to inform ESM state of the energy saving cell to other adjacent cells.

Specifically, to avoid affecting coverage after energy saving, when energy saving cell enters energy saving state, network node can acquire network topology information through ANR (Automatic Neighbor Relation). It can realize energy saving compensation for the scenes covered in overlapping in inter-system and HCS (Hierarchical Cell Structure), but only needing to inform its own ESM state; as for the scene with inter-systems in neighbor relation, energy saving cell is required to inform the cell next to the energy saving cell to enter energy saving compensation state.

Wherein, information on indication for saving energy state comprises the list shown in Table 2.

TABLE 2

Indication for saving energy State IE

| Information type | Information description |
|---|---|
| Message Type | Information type |
| Source Node ID | 源节点信息 |
| Source Cell ID | 源小区信息 |
| Cells to ESM | 节能小区列表 |
| >Cell Information | 节能激活小区信息 |
| >>GSM Cell ID | GSM 小区信息 |
| >>UMTS Cell ID | UMTS 小区信息 |
| >>LTE Cell ID | LTE 小区信息 |
| >ESM Indication | ESM Indication (energy saving activation, energy saving deactivation) |
| >Routing Address | Addressing of core net to target cell |
| >>Target RNC-ID | 目标 RNC 标识 |
| >>>LAI | Location area ID |
| >>>RAC | Routing area ID |
| >>>RNC-ID | Routing area ID |
| >>GERAN-Cell-ID | Target GERAN-Cell-ID |
| >>>LAI | Location area ID |
| >>>RAC | Routing area ID |

TABLE 2-continued

Indication for saving energy State IE

| Information type | Information description |
|---|---|
| >>>CI | Cell ID |
| >>E-UTRAN-Cell-ID | Target EUTRAN-Cell-ID |
| >>>ECGI | Cell ID |

Step 304, cell next to energy saving cell enters energy saving compensation state.

Specifically, adjacent cell entering energy saving compensation state expands its coverage by adjusting its emission power and other ways to compensate the coverage leakage and service demand for saving energy cell.

Step 305, the second network node judges whether the first network node departs from energy saving state based on ESM algorithm and strategy in combination with load condition of itself and network node next to the second network node.

Specifically, network node departing from energy saving state comprises: cell/carrier/transceiver administrated by network node depart from energy saving state, viz. energy saving deactivation.

Step 306, the second network node sends information on indication for saving energy deactivation to target cell of the first network node to awaken target cell to depart from energy saving state.

Step 307, target cell of the first network node departs from energy saving state according to indication of the second network node to recover to normal state.

Step 308, the first network node informs ESM state of target cell to the cell next to the target cell.

Step 309, cell next to target cell departs from energy saving compensation state and recovers to original configuration.

In the following parts, detailed and specific description for saving energy method in embodiments aforesaid will be presented in combination with diversified scenes of inter-system.

Network node of LTE system is eNB, node of core net connected to LTE system is MME; network node of UMTS system is RNC (Radio Network Controller), the node of core net connected to UMTS is SGSN (Serving GPRS Support Node); network node of GSM system is BSC (Base Station Controller), the node of core net connected to BSC is SGSN.

The second network node refers to RNC of UMTS system when the first network node of the embodiments of the present invention refers to eNB of LTE system. The message between eNB and RNC is sent through MME and SGSN. Said second network node refers to eNB of LTE system when said first network node refers to BSC of GSM system. The message between BSC and eNB is sent through MME and SGSN. MME and SGSN units are used to analyze the routing information of the message to send to target node.

Wherein, eNB can transfer load information of the cell itself to RNC or BSC through RIM process, or request load information from RNC or BSC via. RIM PROCESS and carry cell load information in the message. After receiving cell ESM state modification information sent from RNC or BSC, eNB cell can enter/depart from energy saving compensation state based on the information. eNB can judge whether a cell administrated by RNC or BSC departs from energy saving state based on ESM algorithm in combination with load condition of itself and adjacent RNC or BSC; eNB sends information on indication for saving energy deactivation to target cell of RNC or BSC to awaken them to depart from energy saving state.

RNC or BSC equipment can request cell load information from eNB based on RIM PROCESS and also can receive the cell load information transferred by eNB via RIM PROCESS. RNC or BSC judges whether a cell administrated by itself enters energy saving state based on ESM algorithm in combination with load condition of itself and eNB in neighbor; RNC or BSC carries information on indication for saving energy state through RIM process and inform neighbor the ESM state of the cell. Target cell of RNC or BSC departs from energy saving state according to the indication.

The second network node mentioned above refers to BSC of GSM system when the first network node of the embodiments of the present invention is RNC of UMTS system. Iur-g interface is set between RNC and BSC, on which relevant energy saving operations can be conducted without core net node sending message.

Cell load and information on indication for saving energy state as well as other information between RAN nodes of inter-system can be transferred through RIM process on Iur-g interface. Wherein, Information type of Iur-g can only be set as Cell Capacity Class, viz. only Composite Available Capacity Uplink and Composite Available Capacity Downlink are exchanged on Iur-g interface. In view of the multiple system and subsequent system evolved, other interface message may be adopted to transfer information on indication for saving energy state and cell load information. Moreover, cell load information can be transferred in mode of request or response or by carrying load information in request message.

In embodiments of the present invention, relevant energy saving operation can also be realized by carrying indication for saving energy IE during handover. To be specific, network node can instruct target cell to enter energy saving state or awaken target cell of adjacent network node to depart from energy saving state by the way of carrying energy saving indication information in handover process. Energy saving indication carried during handover process comprises list as below; refer to Table 3 for modification of corresponding information.

TABLE 3

Indication for saving energy Carried during Handover

| Information type | Information description |
|---|---|
| ESM Indication | Indication for saving energy (energy saving activation, energy saving deactivation) |

Moreover, relevant energy saving operation can be realized by carrying Cause value into energy saving during handover. It is necessary to add ESM Indication in Cause value to indicate corresponding energy saving operation.

It shall be explained that the present invention can adjust the order of each procedure according to actual requirements.

The technical solution of the embodiments of the present invention has the following advantages, such as providing energy saving procedure in communication network of inter-system, realizing ESM procedure through algorithm strategy and signaling procedure based on interfaces such as S1, Iub, Iu, Abis, A/Gb, Iur-g etc., and adopting distributed energy saving structure to optimize resource utilization rate of the whole network.

Figure 4:
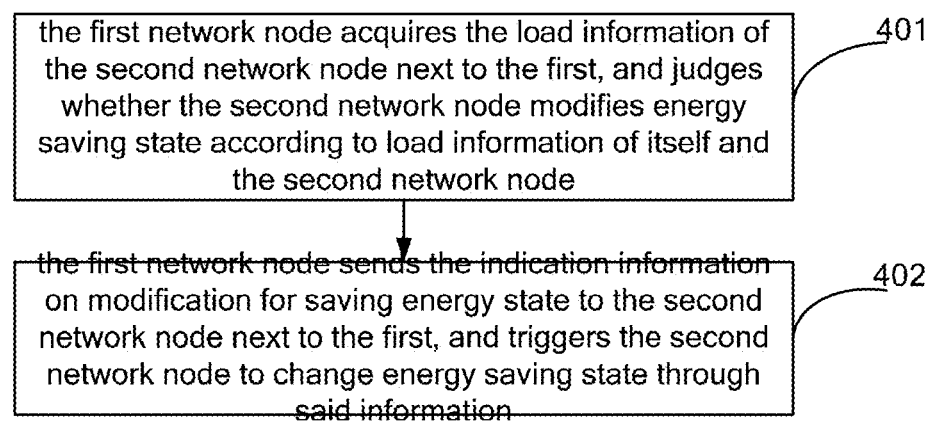
FIG. 4 is a flow diagram for saving energy method of Embodiment 3 of the present invention.

As shown in FIG. 4, it is a flow diagram of method for saving energy in Embodiments 3 of the present invention, comprising the following steps:

Step 401, the first network node acquires the load information of the second network node next to the first, and judges whether the second network node modifies energy saving state according to load information of itself and the second network node.

Specifically, the first network node can send load information transmission request message to the second network node and receive the load information transmission response message returned from the second network node to acquire load information of the second network node based on the request and response; the first network node can also receive load information transmission request message from the second network node to acquire load information of the second network node carried in request message. Wherein, load information comprises at least one item among the following: hardware load indicator, S1 TNL load indicator, radio resource status, composite available capacity uplink, and composite available capacity downlink.

Step 402, the first network node sends the indication information on modification for saving energy state to the second network node next to the first, and triggers the second network node to change energy saving state through said information.

Specifically, the second network node can change energy saving state based on information on indication for saving energy state after the first network node sends the said information to the second network node; also, the second network node can decide whether to change the energy saving state according to said information and its own energy saving strategy and return the indication on whether to change energy saving state to the first network node.

Wherein, the second network node changes energy saving state, comprising: the second network node enters or departs from energy saving state. The second network node can send information on indication for saving energy state to the third network node next to the second after entering energy saving state and inform the third network node the information of modifying energy saving state through information on indication for saving energy state. Said third network node can share the same node with the first network node. After entering energy saving state, the second network node can acquire network topology information and determine whether it is necessary to send information on indication for saving energy state to the third network node according to the network topology information.

After the second network node informs the information of modifying its energy saving state to the third network node through said information on indication for saving energy state, the third network node can enter or depart from energy saving state based on the information. Wherein, information on indication for saving energy state modification and information on indication for saving energy state comprise at least one item among the following: source eNB ID, source cell ID, target eNB ID, target cell ID, routing information, energy saving instruction and reason for handover.

The technical solution of the embodiments of the present invention has the following advantages, such as providing energy saving procedure in communication network of inter-system, realizing ESM procedure through algorithm strategy and signaling procedure, and adopting distributed energy saving structure to optimize resource utilization rate of the whole network.

Figure 5:
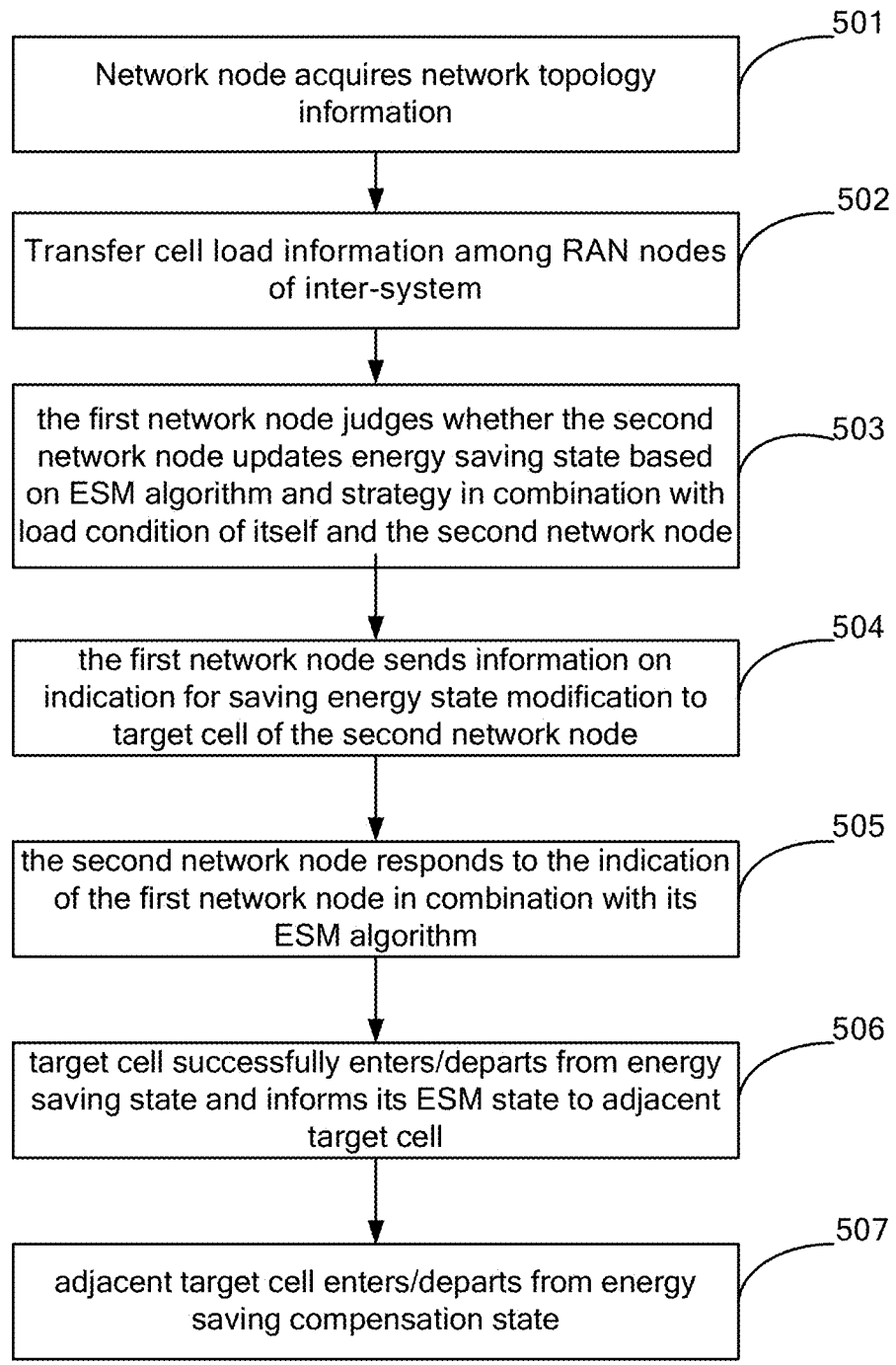
FIG. 5 is a flow diagram for saving energy method of Embodiment 4 of the present invention.

As shown in FIG. 5, it is a flow diagram of method for saving energy in Embodiments 4 of the present invention, comprising the following steps:

Step 501, network node acquires network topology information.

Specifically, neighbor relation list can be acquired via ANR, which can comprise adjacent ID, whether there is X2 port and whether can be switched, etc.

Step 502, cell load information is transferred among RAN nodes of inter-system.

Specifically, cell load and other information can be transferred through RIM process. In view of the multiple system and subsequent system evolved, other interface message can be adopted to transfer information on indication for saving energy state and cell load information. Moreover, cell load information can be transferred in mode of request or response or by carrying load information in request message.

Step 503, the first network node judges whether the second network node updates energy saving state based on ESM algorithm and strategy in combination with load condition of itself and the second network node.

Specifically, the second network node updates energy saving state comprises: cell/carrier/transceiver administrated by the second network node enters or departs from energy saving state, viz. energy saving activation/energy saving deactivation.

Step 504, the first network node sends information on indication for saving energy state modification to target cell of the second network node.

Step 505, the second network node responds to the indication of the first network node in combination with its ESM algorithm.

Specifically, the second network node can directly implement decision of the first network node to order target cell to enter/depart from energy saving state directly; also, the second network node can negotiate about and feed back the indication of the first network node based on its ESM algorithm and strategy and return the indication whether to enter/depart from energy saving to the first network node. If the second network node allows cell/carrier/transceiver administrated by itself to enter/depart from energy saving state, return the indication of successfully entering/departing from energy saving state to the first network node; while if the second network node does not allow the administrated cell to enter/depart from energy saving state, return the indication of failing to enter/depart from energy saving state to the first network node.

Step 506, target cell successfully enters/departs from energy saving state and informs its ESM state to adjacent target cell.

Step 507, adjacent target cell enters/departs from energy saving compensation state.

It shall be explained that if target cell fails to enter energy saving state, keep the original configuration and it is unnecessary to inform its ESM state to adjacent target cell; adjacent cell will be kept at original configuration as well.

In the following parts, detailed and specific description of method for saving energy in embodiment of the present invention will be presented.

The second network node refers to RNC of UMTS system when the first network node of the embodiments of the present invention is eNB of LTE system. The message between eNB and RNC is sent through MME and SGSN. Said second network node refers to eNB of LTE system when said first network node is BSC of GSM system. The message between BSC and eNB is sent through MME and SGSN. MME and SGSN units are used to analyze the routing information of the message to send to target node.

Wherein, eNB can acquire neighbor relation list via ANR; eNB can transfer load information of the cell to RNC or BSC through RIM process, or request load information from RNC or BSC via RIM process and carry cell load information in the message. After receiving indication of allowing entering/departing from energy saving state sent from RNC or BSC, eNB cell can implement decision of RNC or BSC directly to enable its target cell to enter/depart from energy saving state; also, eNB can feed back the indication whether to enter/depart from energy saving state (success/failure) based on ESM algorithm. If target cell enters/departs from energy saving state, eNB informs ESM state of the cell to neighbor; otherwise, eNB keeps the original configuration.

RNC or BSC equipment can request cell load information from eNB based on RIM process and also can receive the cell load information transferred by eNB via RIM PROCESS. RNC or BSC judges whether a cell administrated by eNB enters/departs from energy saving state based on ESM algorithm in combination with load condition of itself and eNB in neighbor; sends indication of allowing entering/departing from energy saving state to target cell of eNB, receives feedback (success/failure) on energy saving indication from eNB. RNC or BSC can enter/depart from energy saving compensation state after receiving information of cell ESM state modification sent by eNB.

The second network node mentioned above refers to BSC of GSM system when the first network node of the embodiments of the present invention is RNC of UMTS system. Iur-g interface is set between RNC and BSC, on which relevant energy saving operations can be conducted without core net node sending message.

It shall be explained that the present invention can adjust the order of each procedure according to actual requirements.

The technical solution of the embodiments of the present invention has the following advantages, such as providing energy saving procedure in communication network of inter-system, realizing ESM procedure through algorithm strategy and signaling procedure based on interfaces such as S1, Iub, Iu, Abis, A/Gb, Iur-g etc., and adopting distributed energy saving structure to optimize resource utilization rate of the whole network.

Figure 6:
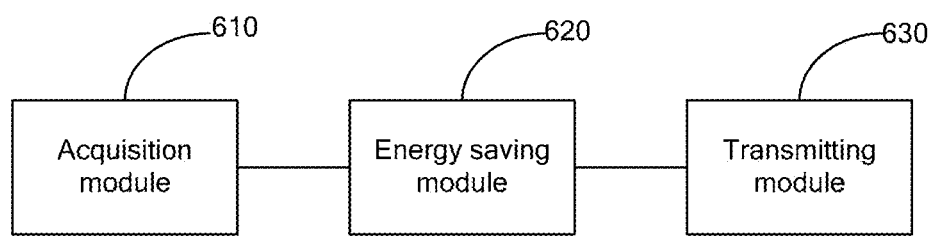
FIG. 6 is a structure diagram of network node of Embodiment 5 of the present invention.

As shown in FIG. 6, it is a structure diagram of network node in Embodiments 5 of the present invention, comprising:

Acquisition module 610, which is used for acquiring the load information of the adjacent network node.

Specifically, said acquisition module 610 is used for sending load information transmission request message to the adjacent network node and receiving load information transmission response message returned by the adjacent network node, thus acquiring the load information of the adjacent network node through said request and response message, or Receiving the load information from said adjacent network node to transfer request message, thus acquiring the load information of said adjacent network node carried in said request message.

Energy saving module 620, which is used for entering energy saving state according to the load information of said network node and that of the adjacent network node acquired by said acquisition module 610.

Transmitting module 630, which is used for sending the information on indication for saving energy state to the adjacent network node when said energy saving module 620 enters energy saving state, and informing said adjacent network node of the information that said network node enters energy saving state through said information.

Said acquisition module 610 is also used for acquiring information on indication for saving energy deactivation from adjacent network node. Accordingly, said acquisition module 620 is also used for departing from energy saving state according to said information on indication for saving energy deactivation; and said acquisition module 630 can also be used for sending information on indication for saving energy state to the adjacent network node and informing the information that said network node departs from energy saving state to all said adjacent network nodes through said information on indication for saving energy state.

Said acquisition module 610 is also used for acquiring network topology information. Said network topology information is used for determining whether it is necessary to send information on indication for saving energy state to said adjacent network node.

The technical solution of the embodiments of the present invention has the following advantages, such as providing energy saving procedure in communication network of inter-system, realizing ESM procedure through algorithm strategy and signaling procedure, and adopting distributed energy saving structure to optimize resource utilization rate of the whole network.

Figure 7:
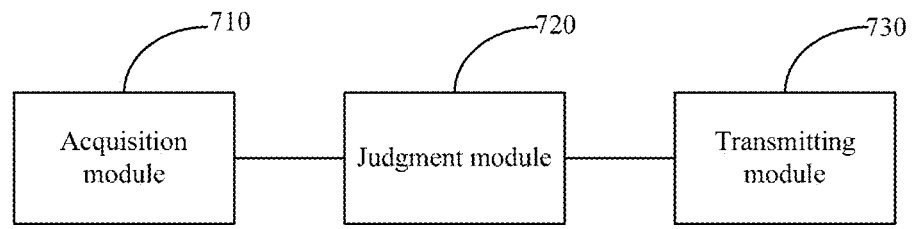
FIG. 7 is a structure diagram of network node of Embodiment 6 of the present invention.

As shown in FIG. 7, it is a structure diagram of network node in Embodiments 6 of the present invention, comprising:

Acquisition module 710, which is used for acquiring the load information of the adjacent network node.

Specifically, said acquisition module 710 is used for sending load information transmission request message to the adjacent network node and receiving load information transmission response message returned by the adjacent network node, thus acquiring the load information of the adjacent network node through said request and response message, or Receiving the load information from said adjacent network node to transfer request message, thus acquiring the load information of said adjacent network node carried in said request message.

Judgment module 720, which is used for judging whether said adjacent network node is allowed to modify energy saving state according to the load information of said network node and that of the adjacent network node acquired by said acquisition module.

Transmitting module 730, which is used for sending the information on indication of modification for saving energy state to said adjacent network node when said judgment module allows said adjacent network node to modify energy saving state, and triggering said adjacent network node to modify energy saving state through said information.

The technical solution of the embodiments of the present invention has the following advantages, such as providing energy saving procedure in communication network of inter-system, realizing ESM procedure through algorithm strategy and signaling procedure, and adopting distributed energy saving structure to optimize resource utilization rate of the whole network.

Through description of the above embodiments, technical personnel of the field can clearly understand that the present invention can be realized depending on software and necessary general hardware platform, and it also can be realized through hardware, while the former is better in many cases. Based on this understanding, the technical solution of the present invention or the part making contributions to available technology can be essentially reflected by means of software product. This computer software product is stored in a storage medium, including several instructions to enable a terminal unit (such as handset, personal computer, sever, or network equipment, etc.) to implement the methods described in all embodiments of the present invention.

Only the preferred embodiments of the present invention are mentioned above. It shall be pointed out that technical personnel of the technical field can make any improvement and modification, which also shall be protected by the present invention.

Technician of this field can understand that module in device of embodiment can be distributed thereof according to the description and also can be distributed in one or more devices that is different from this embodiment. Modules of said embodiments can be integrated or deployed in separation, or combined as a module and even dismantled into several sub-modules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method for saving energy comprising:
   acquiring, by a first network node, load information of a second network node next to the first network node, and entering energy saving state according to load information of the first network node and the load information of said second network node;
   sending, by the first network node, information on indication for saving energy state to a third network node next to the first network node, and informing said third network node of information that the first network node has entered energy saving state through said information on indication for saving energy state.

2. The method as claimed in claim 1, wherein, after said first network node informs said third network node of the information that the first network node has entered energy saving state via said information on indication for saving energy state, the method further comprises:
   entering, by the third network node, energy saving compensation state according to said information on indication for saving energy state.

3. The method as claimed in claim 2, wherein, after said first network node informs said third network node of the information that the first network node has entered energy saving state via said information on indication for saving energy state to said third network node, the method further comprises:
   judging, by the third network node, whether said first network node departs from energy saving state according to load information of the third network node and sending information on indication for saving energy deactivation to said first network node,
   receiving, by the first network node, the information on indication for saving energy deactivation and departing from energy saving state based on the information on indication for saving energy deactivation.

4. The method as claimed in claim 3, wherein, after said first network node departs from energy saving state based on the information on indication for saving energy deactivation, the method further comprises:
   sending, by the first network node, information on indication for saving energy state to said third network node to inform information of departing from energy saving state to the third network node,
   departing, by the third network node, from energy saving compensation state based on the information on indication for saving energy state which informs the information of departing from energy saving state to the third network node.

5. The method as claimed in claim 1, wherein, after said first network node enters energy saving state according to the load information of the first network node and the load information of said second network node, the method further comprises:
   acquiring, by the first network node, network topology information and determining whether it is necessary to send the information on indication for saving energy state to the third network node according to the network topology information.

6. The method as claimed in claim 1, wherein, acquiring, by said first network node, the load information of said second network node next to the first network node comprises:
   sending, by the first network node, a load information transmission request message to said second network node, and receiving a load information transmission response message returned by said second network node, acquiring the load information of said second network node through said request message and the response message; or
   receiving, by the first network node, a load information transmission request message from said second network node, and acquiring the load information of said second network node carried in said request message from said second network node.

7. The method as claimed in claim 1, wherein, each of said load information comprises at least one of the following:
   Hardware load indicator, S1 TNL load indicator, radio resource status, composite available capacity uplink, composite available capacity downlink.

8. A method for saving energy comprising:
   acquiring, by a first network node, load information of a second network node next to the first network node, and judging whether said second network node modifies energy saving state according to load information of the first network node and the load information of said second network node;
   sending, by the first network node, information on indication of modification for saving energy state to the second network node to trigger the second network node to change energy saving state.

9. The method as claimed in claim 8, wherein, after said first network node sends the information on indication of modification for saving energy state to the second network node, the method further comprises:
   modifying, by the second network node, energy saving state based on the information on indication of modification for saving energy state; or
   determining, by the second network node, whether to change the energy saving state according to said information on indication of modification for saving energy state and an energy saving strategy of the second network node and returning an indication on whether to change energy saving state to the first network node.

10. The method as claimed in claim 8, wherein, said second network node changing the energy saving state comprises:

entering or departing from energy saving state.

11. The method as claimed in claim 10, wherein, after said second network node changes the energy saving state, the method further comprises:
   sending, by the second network node, information on indication for saving energy state to a third network node next to the second network node to inform said third network node information that the second network node has changed energy saving state.

12. The method as claimed in claim 11, wherein, after said second network node changes energy saving state, the method further comprises:
   acquiring, by the second network node, network topology information and determining whether it is necessary to send the information on indication for saving energy state to said third network node according to said network topology information.

13. The method as claimed in claim 11, wherein, after said second network node informs said third network node the information that the second network node has changed energy saving state through the information on indication for saving energy state, the method further comprises:
   entering or departing, by the third network node, from energy saving compensation state according to said information on indication for saving energy state.

14. The method as claimed in claim 8, wherein, said first network node acquiring the load information of said second network node next to the first network node comprises:
   sending, by the first network node, a load information transmission request message to said second network node, and receiving a load information transmission response message returned by said second network node, acquiring the load information of said second network node through said request message and the response message; or receiving, by the first network node, a load information transmission request message from said second network node, and acquiring the load information of said second network node carried in said request message from said second network node.

15. The method as claimed in claim 8, wherein, each of said load information comprises at least one of the following:
   Hardware load indicator indication information, S1 TNL load indicator, radio resource status, composite available capacity uplink, composite available capacity downlink.

16. A network node comprising:
   an acquisition module, which is used for acquiring load information of one adjacent network node;
   an energy saving module, which is used for entering energy saving state according to load information of said network node and the load information of the one adjacent network node acquired by said acquisition module;
   a transmitting module, which is used for sending information on indication for saving energy state to another adjacent network node when said energy saving module enters energy saving state, and informing said another adjacent network node of information that said network node enters energy saving state through said information on indication for saving energy state.

17. The network node as claimed in claim 16, wherein, the acquisition module is also used for acquiring information on indication for saving energy deactivation from the another adjacent network node;
   the energy saving module is also used for departing from energy saving state according to the information on indication for saving energy deactivation.

18. The network node as claimed in claim 17, wherein, the transmitting module is also used for sending information on indication for saving energy state to the another adjacent network node to inform information that said network node departs from energy saving state to said another adjacent network node.

* * * * *